United States Patent
Cooper

[11] 3,841,828
[45] Oct. 15, 1974

[54] EXHAUST GAS TREATMENT SYSTEM
[75] Inventor: Raymond Edward Cooper, Milford, Conn.
[73] Assignee: Liberty Industries, Inc., Berlin, Conn.
[22] Filed: Feb. 8, 1972
[21] Appl. No.: 224,444

[52] U.S. Cl. ............................. 432/222, 23/277 C
[51] Int. Cl. ............................................. F23l 9/04
[58] Field of Search ............... 432/219, 220, 222; 23/277 C

[56] References Cited
UNITED STATES PATENTS

| | | | |
|---|---|---|---|
| 2,769,504 | 11/1956 | Miller | 432/222 X |
| 2,952,452 | 9/1960 | Kopf | 432/105 |
| 3,064,720 | 11/1962 | Keating et al. | 432/222 X |
| 3,119,604 | 1/1964 | Biber et al. | 432/219 |
| 3,417,977 | 12/1968 | Nelson | 432/222 X |
| 3,592,614 | 7/1971 | Schmidt | 23/277 C |

*Primary Examiner*—John J. Camby
*Attorney, Agent, or Firm*—Prutzman, Hayes, Kalb & Chilton

[57] ABSTRACT

A system for treating virus contaminated exhaust gas prior to discharge into the atmosphere couples high efficiency filtration with in-line combustion of all exhaust gas prior to discharge. The filtration prohibits the passage of exhaust particles larger than about one-half micron while the in-line combustion requires dispersed entrainment of all filtered exhaust gas within an elongated flame zone prior to release to the atmosphere.

7 Claims, 4 Drawing Figures

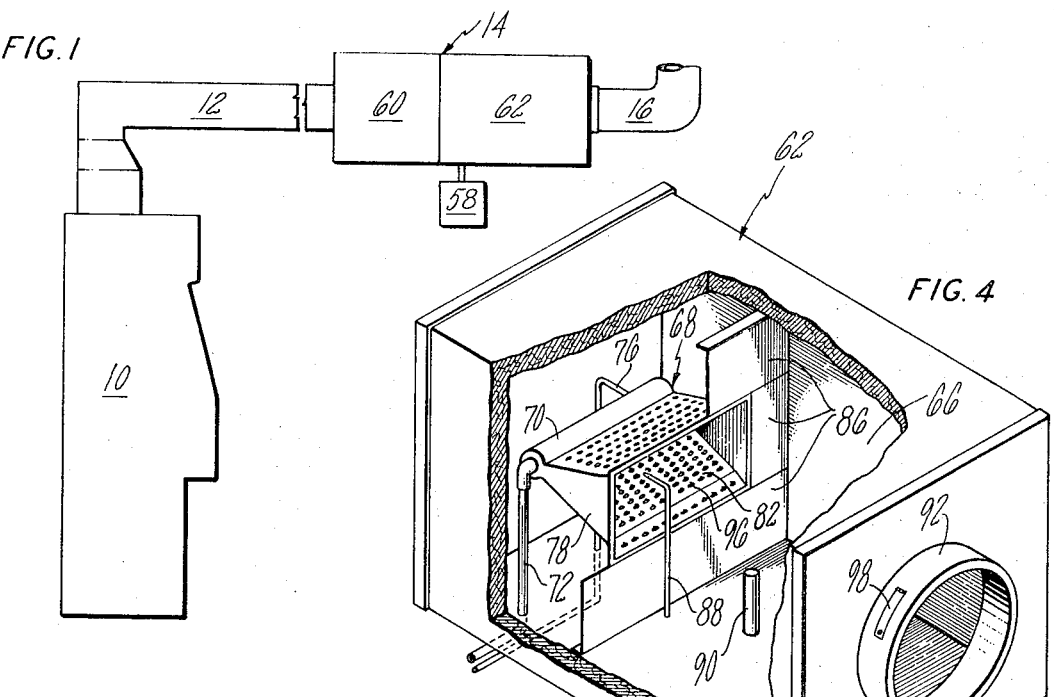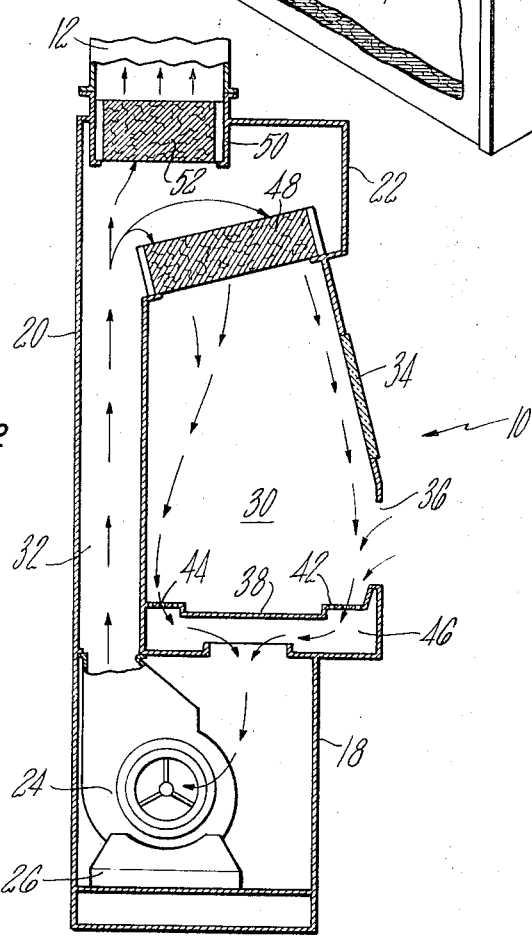

3,841,828

EXHAUST GAS TREATMENT SYSTEM

BACKGROUND AND SUMMARY OF THE INVENTION

The present invention relates generally to a system for treating exhaust gases prior to discharge into the atmosphere. More particularly, it relates to a new and improved method and apparatus for decontaminating gases drawn from an environment exposed to potentially harmful materials, such as virus containing material and the like, prior to their discharge into the atmosphere.

Frequently when working with contagious or otherwise harmful biological species such as viruses or the like it is necessary to conduct substantially all operations within an enclosed or substantially confined work area such as a fully or partially enclosed, hooded work surface. While such an arrangement affords protection to the person working with the hazardous materials, the air discharge system associated with the hood or work area frequently fails to appropriately treat the exhaust gases to prevent the discharge of potentially hazardous materials into the atmosphere. Although certain filtering arrangements have been incorporated into most exhaust systems, these filters are not sufficiently effective in eliminating the discharge of extremely small particles, such as particles of less than micron size.

Accordingly, it is an object of the present invention to provide a new and improved system for treating contaminated exhaust gas from an enclosed work area prior to discharge into the atmosphere so as to eliminate contamination of the atmosphere by extremely small, harmful particles entrained within the gas, such as viable viral particles carried by exhaust gases from hooded biological work areas.

Another object of the present invention is to provide a new and improved method and apparatus of the type described for providing maximum efficiency, in-line decontamination of virus contaminated exhaust gas. Included in this object is the provision for a system utilizing both high efficiency filtration techniques and incendiary deactivation of all biological materials entrained within the exhaust gas.

Still another object of the present invention is to provide a system of the type described that is of economical manufacture yet capable of handling high volume exhaust flow from multiple sources without interfering with the effectiveness and efficiency of ambient environmental conditions within the work area. Included in this object is the provision for a system that can be incorporated into existing exhaust systems in an efficient and economical manner.

Other objects will be in part obvious and in part pointed out in more detail hereinafter.

These and related objects can be accomplished in accordance with the present invention by providing an exhaust system adapted for association with enclosed work areas having recirculating ambient environments by providing not only absolute filtration through a high efficiency particulate air filter but also in-line controlled combustion of all exhaust gas prior to discharge into the atmosphere. The combustion chamber utilized in the system is provided with an injection baffle arrangement to confine the exhaust gas and assure passage thereof through the combustion chamber. The baffle arrangement includes a plurality of exhaust gas injection ports longitudinal dispersed along the combustion chamber whereby all viable viral particles are entrained within an elongated combustion flame of controlled temperature to assure deactivation of all viral particles passing therethrough prior to discharge into the atmosphere.

A better understanding of the objects, advantages, features, properties and relationships of the invention will be obtained from the following detailed description and accompanying drawings which set forth an illustrative embodiment and are indicative of the way in which the principles of the invention are employed.

BRIEF DESCRIPTION OF THE DRAWINGS

In the drawings:

FIG. 1 is a diagrammatic illustration of an exhaust system incorporating the features of the present invention.

FIG. 2 is an enlarged elevational view, in section, of a hooded work area of the system of FIG. 1.

FIG. 4 is a perspective view partially broken away of the burner section of the system illustrating certain features of the burner and combustion chamber.

DESCRIPTION OF A PREFERRED EMBODIMENT

Figure 3:
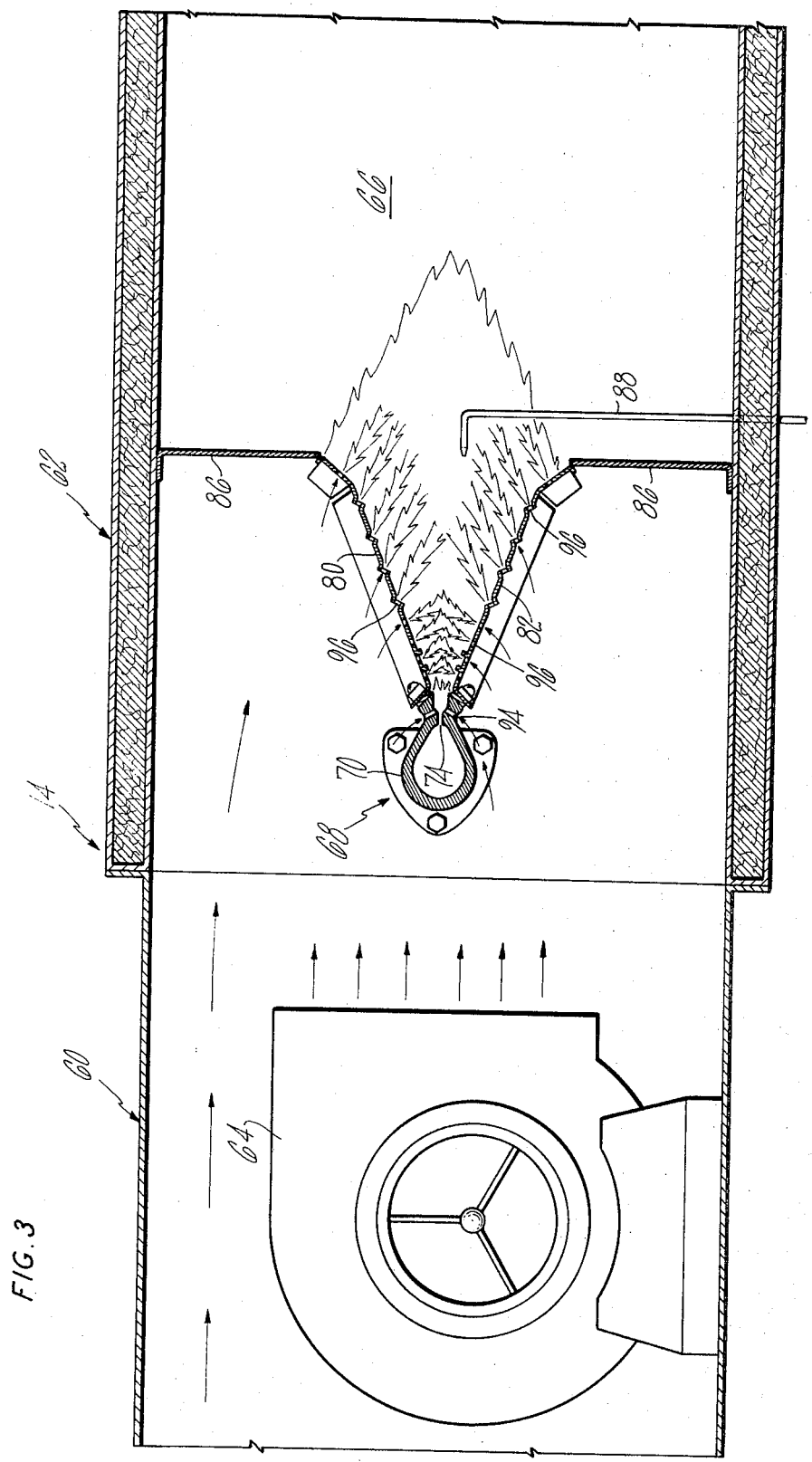
FIG. 3 is an enlarged sectional view of the combustion unit of the system of FIG. 1, showing the blower and burner sections thereof.

Referring now to the drawings in greater detail wherein like reference numerals indicate like parts throughout the several figures, the exhaust system is illustrated in FIG. 1 as comprised of a single enclosed hooded work area 10 of controlled environment connected through a suitable collection duct network 12 and filter arrangement to an in-line combustion unit, designated generally by the numeral 14, where entrained viral particles or similar materials are rendered ineffective prior to discharge into the atmosphere through an exhaust stack 16.

Referring initially to FIG. 2, the hooded work area 10 is shown as consisting of a support base 18, a central hood portion 20 and an exhaust and recirculating plenum portion 22. The base 18 houses an air circulating blower or fan 24 of the centrifugal type suitably positioned and supported therein by a blower unit 26. The central hood portion 20 is of the descending air curtain type having an enlarged work area 30 in the front portion thereof and a separated air return passage 32 extending throughout the height of the central portion adjacent its back wall and connecting the output end of the air circulating blower 24 to the top plenum portion 22 of the hood. The central hood portion is provided with a viewing window 34 and a hand access opening port 36 in the front face thereof which remains unobstructed but is closed by the descending curtain of air or other circulating gas within the hood. A recessed work shelf 38 is secured below the level of the access opening by means of front and rear perforated air flow platens, 42 and 44 respectively, positioned on opposite sides of the work shelf. A plenum area 46 below the shelf 38 is provided with a large opening communicating with the interior of the support base 18 and the intake of the blower 24 thereby facilitating the flow of air or other gas through the platens 42, 44 under the influence of the air recirculating blower 24. In addition, the top of the work area 30 is enclosed by a high efficiency filter 48 that separates the work area from the gas circulating top plenum 22 and assures that the air or gas cascading through the work area and eveloping the material on the work shelf is of appropriate quality.

The top plenum 22 is provided with an exhaust collar 50 connected to the damper controlled collection duct network 12 and an absolute filter 52 is mounted within the collar to effect high efficiency filtration of all exhaust gas leaving the hood 10. Only a controlled amount of the circulating air or gas within the hood is passed through the exhaust collar 50. The specific amount of gas passing into the collection duct system may be controlled in a number of ways and in the illustrated embodiment will not exceed a maximum of about 20 percent of the total volume being circulated but will preferably constitute at least 10 percent of the air.

The volume of air exhausted through the exhaust collar 50 is replenished at the work surface access opening 36. That opening is provided with an air foil design along its lower edge to minimize air turbulence and facilitate the immediate downward flow of the make-up air upon entering the work area. As will be appreciated the recirculating air flowing downwardly through the work area 30 effectively blankets the work shelf 38 and protects the material carried thereon. The make-up air entering through the port 36 tends to immediately pass through the perforated platen 42 extending along the entire front edge of the work surface 38, into the plenum 46 and through the filter 48 before coming into contact with the material carried by the work shelf 38.

Under certain circumstances it may be desirable to utilize a hooded work area having no recirculating system. Under such circumstances 100 percent of the exhaust gases are passed into the collection duct network and the amount of air recirculated by the unit 10 might be replaced with a fresh supply of air entering the top plenum of the work station through a suitable prefilter access port. The fresh supply of air would also pass through an absolute filter, such as the filter 48, prior to entry into the actual work area. Advantageously the amount of air supplied to the work area through the top plenum would constitute less than the quantity needed to replenish the gas being exhausted so that a negative pressure would be created in the top plenum and additional air intake would be effected through the work surface access opening in much the same manner as described hereinbefore.

As mentioned, filters are utilized to cleanse the gas sweeping down through the work area and are provided in the exhaust system to control the quality of the gas being exhausted from the hood. In the preferred embodiment the filter 52 for the exhaust system is conveniently positioned within the exhaust collar 50 of the hood and is of the absolute filter type. It is a high efficiency particulate air filter having a 99.99 percent efficiency and the capability of retaining all particles of about 0.3 micron and larger. The filter must be capable not only of high efficiency filtration but also of handling the normal air flow through the system without creating an undesirable pressure drop across the filter. For example, the average velocity of the recirculating air or gas going through the hood is about 100 cubic feet per minute and the flow of exhaust gas through the filter is approximately 800 cubic feet per minute during normal operation with an exhaust gas component amounting to about 10–20%.

It will, of course, be appreciated that the collection duct systems used in conveying the filtered exhaust gases from the hood 10 to the combustion unit 14 of the system are preferably sealed to prevent loss of contaminated exhaust gas therefrom. The sealed sheet metal ducts may also contain appropriate manually or automatically operated dampers, air flow switches and the like. Additionally, it will be appreciated that a number of hooded work areas may be connected by such collection duct networks to a single combustion unit 14 for improved efficiency of operation.

Referring now to FIGS. 1 and 3, combustion unit 14 is shown as an in-line unit having a suitable control panel 58 and consisting of tandemly arranged blower and burner compartments, 60 and 62 respectively. The exhaust gases from one or more work areas are assisted in their travel through the initial exhaust filter 52 and are drawn or sucked along the collection ducts 12 toward the in-line combustion unit 14 by a fan or blower 64 within the sheet metal blower compartment 60. The blower 64 consists essentially of a motor driven centrifugal blower or fan similar in design and construction to the air circulating blower housed within the base 18 of the hooded work area. As will be appreciated, the blower 64 will tend to create a slight negative pressure within the collection network assuring that none of the exhaust gas escapes therefrom.

A combustion chamber 66 of the combustion unit 14 is housed within the insulated double wall burner compartment 62 immediately downstream of the blower and is provided with a burner unit 68 extending transversely of the compartment across substantially its entire dimension. As best shown in FIG. 4, the unit includes a tubular burner 70 having a suitable fuel inlet conduit 72 connected to one end for feeding a controlled supply of fuel thereto and fuel discharge ports 74 facing downstream toward the combustion chamber 66. Additionally, a pilot line 76 and suitable pilot light (not shown) are associated with the burner to provide ignition thereof.

Flaring outwardly and downstream of the burner 70 and forming a part of the burner unit 68 is a horn-shaped combustion baffle 78 including a pair of suitably apertured baffle plates 80, 82 for injecting spaced jets of exhaust gas into the flame zone of the combustion chamber in the manner illustrated in FIG. 3. As shown, the burner operates fully within the flow stream of the exhaust gas to provide full in-line combustion. In fact, in accordance with the present invention, all of the exhaust gases travel through the apertured baffle plates 80, 82 and into the flame zone of the combustion chamber since alternative routes are foreclosed by a plurality of barrier plates, generally designated 86, secured to the side walls of the burner compartment 62. The plates 86 confinably surround the outer rim of the baffle 78 and prevent the passage of exhaust gases downstream except through the baffle plates 80, 82 and consequently through the flame zone of the burner unit.

As shown in FIG. 1, the burner is provided with a suitable control panel 58 for monitoring the operation of the combustion unit. The panel is connected to suitable detection and control means within the combustion unit. For example, a flame detection scanner 88, capable of detecting flame failure within the burner, and a capillary unit 90 for sensing and controlling the temperature within the combustion chamber are illustrative of the types of control units utilized in the combustion unit for controlling its operation. Preferably the control panel should have both audible and visual alarm systems in the event of blower or flame failure or a fluctuation in the burner temperature above or below the preferred operating range of 500°–600°F. In fact, if desired, the control unit may be adjusted to provide a warning signal within a 20°F fluctuation from the preferred operating temperature of 550°F. Additionally the control unit will close dampers upstream in the event of flame failure thereby preventing a blow-back condition from reaching the work area.

An insulated double wall discharge collar 92 is provided at the downstream end of the burner compartment 62 for connection with the double wall exhaust vent or pipe 16. Advantageously the collar 92 may be provided with means for collecting a sample of the effluent from the combustion chamber in order to monitor the effectiveness of the combustion chamber in eliminating the discharge of viable viral particles. Similarly a virus injection port (not shown) may be provided immediately upstream of the blower compartment so that controlled test evaluations can be conducted on the effectiveness of the combustion unit's operation.

In the preferred embodiment fuel gas is fed directly to the tubular fuel burner 70 while the air within the exhaust stream passes through air ports 94 in the burner and the plurality of spaced air injection ports 96 in the combustion baffle to provide the desired elongated flame zone extending downstream from the burner. The burner is, of course, fired with and substantially parallel to the air flow by virtue of velocity impact from the blower and the suction generated by the diverging shape of the combustion baffle 78. Additionally, as a result of the confining action of the barrier plates 86 on the exhaust gas delivered toward the combustion chamber by the blower, the air is induced to flow through the apertures in the baffle plates as multiple jets assuring full utilization of the exhaust gases and elongation of the combustion flame.

Thus, the air or exhaust gas containing a viable virus not trapped within the absolute filter 52 is directly entrained within the flame at temperatures of about 550°F and the viruses are rendered inactive and noninfective upon leaving the system through the exhaust stack 16. Accordingly, the process and apparatus of the present invention assures that viable viral particles are not discharged into the atmosphere.

For testing the virus deactivation capability of the combustion unit a predetermined amount of specified virus can be introduced into the exhaust gas stream at an injection port just upstream of the blower 64. The injection port is constructed so as to assure that the nozzle of a spray aerosol device can be inserted into the port and result in an air tight fit therewith. Thereafter virus can be sprayed into the metal collection duct and immediately delivered by the blower to the combustion chamber. As mentioned, the discharge or exhaust collar 92 at the downstream end of combustion chamber is provided with a sample port 98 for obtaining a sample of the effluent gases from the combustion chamber. A sterile Seitz filtration pad can be inserted to trap particles, such as viruses, as they are expelled from the chamber. The pad is then aseptically removed to a sterile container, washed and immersed in sterile saline solution. The container is tightly sealed and subjected to constant but gentle agitation for about one hour to shake loose any virus particles that may have attached to the Seitz pad. The pad is then squeezed dry and all the saline solution treated for virus, using an appropriate test system. For example, if phage were used as the virus, bacteria sensitive to the lytic effect of the phage could be employed. The saline solution suspected of containing phage, would then be inoculated into broth cultures containing the phage-sensitive bacteria. Bacterial lysis would be indicative of viable phage particles. The absence of bacterial lysis would indicate the non-existence of viable infective phage and would establish that no viable particles passed through the system to the exhaust stack.

After testing the efficiency of the combustion unit, a positive control procedure could be employed to make certain that the Seitz pad is capable of trapping viruses. This could be done by following the same procedure just outlined except that the combustion unit would not be ignited. The presence of viruses on the pad would indicate that the Seitz pad is capable of trapping viruses and therefore that the testing procedure is adequate in evaluating the efficiency of the unit. If viruses cannot be found on the pad, it would indicate that either the pad is incapable of trapping viruses or that the virus particles did not reach the Seitz pad.

As can be seen from the foregoing detailed description, the apparatus and method of the present invention provided an accurate, improved and reliable system for treating virus contaminated exhaust gas prior to discharge into the atmosphere. This system can be utilized in conjunction with single or multiple exhaust units and is particularly useful in exhaust networks of one or more hooded work areas. Exhaust gases from these work areas are first drawn through an absolute filter for the removal of all or substantially all particles having a size larger than about one half micron. The exhaust gas from the filter is then conveyed through a sealed collection network to a combustion unit where it is impelled into the flame of the combustion chamber. Any virus or other small particle not retained by the absolute filter is thereby entrained directly in the combustion flame and rendered inactive and noninfective. As will be appreciated, in the preferred embodiment the exhaust gas consists essentially of air and is utilized to assist in the combustion of the fuel used in the combustion unit. The fuel input and exhaust gas flow are controlled to effect a rapid increase in exhaust gas temperature from room temperature, i.e., about 75°F in the work area, to the virus deactivating temperature, i.e., about 550°F in the combustion chamber. The effluent from the combustion chamber is then discharged through a suitable exhaust stack to the atmosphere, the treatment assuring that viable virus particles are not included in the effluent.

As will be apparent to persons skilled in the art various modifications, adaptations and variations of the foregoing specific disclosure can be made without departing from the teachings of the present invention.

I claim:

1. In a system for treating virus contaminated exhaust gas prior to discharge into the atmosphere, the combination including a work station having a high efficiency particulate air filter; a combustion chamber spaced from the work station, said chamber having a diverging flame zone; a conduit connecting the work station with the combustion chamber for the passage of all exhaust gas through said chamber; exhaust gas drive means for drawing said exhaust gas through the conduit and toward the combustion chamber, said combustion chamber including a fuel discharge port and an associated baffle for confining all the exhaust gas conveyed through the conduit and injecting the confined gas into the flame zone of the combustion chamber to elongate the flame downstream within the combustion chamber to effect the deactivation of all entrained viral particles in the exhaust gas; and effluent discharge means connected to said combustion chamber for discharging the effluent from said combustion chamber.

2. The system of claim 1 wherein the filter is capable of retaining particles having a size of about 0.3 micron and larger.

3. The system of claim 1 wherein the exhaust gas drive means includes a blower adjacent and upstream of the combustion chamber for driving the exhaust gas into the chamber.

4. The system of claim 1 wherein the baffle includes barrier means for preventing flow of the exhaust gas downstream of said combustion chamber, the baffle means including a plurality of gas injection ports spaced from the fuel discharge port and providing communication between the conduit and the combustion chamber for directing all of the exhaust gas confined by the barrier means into the combustion chamber.

5. The system of claim 1 wherein the baffle means includes a pair of apertured baffle plates flaring outwardly from the fuel discharge port and facilitating the formation of an elongated flame pattern within the combustion chamber extending downstream from the fuel discharge port.

6. The system of claim 1 including an enclosed work area provided with gas recirculating means and an exhaust port associated with the filter for exhausting only a minor proportion of the recirculating gas within the work area.

7. The system of claim 1 including an enclosed work area having a work surface, an absolute filter for filtering a major proportion of the gas passing over the work surface, an exhaust port and exhaust gas drive means for moving the gas from the work surface toward the exhaust port.

* * * * *